(12) United States Patent
Ho

(10) Patent No.: US 6,979,967 B2
(45) Date of Patent: Dec. 27, 2005

(54) EFFICIENCY OPTIMIZATION CONTROL FOR PERMANENT MAGNET MOTOR DRIVE

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/057,346

(22) Filed: Feb. 14, 2005

(65) Prior Publication Data

US 2005/0146297 A1 Jul. 7, 2005

Related U.S. Application Data

(63) Continuation of application No. 10/684,928, filed on Oct. 14, 2003, now Pat. No. 6,856,109.

(60) Provisional application No. 60/418,735, filed on Oct. 15, 2002.

(51) Int. Cl.$^7$ .............................................. H02P 6/18
(52) U.S. Cl. ..................................... 318/254; 318/721
(58) Field of Search ............................... 318/138, 254, 318/439, 720–724

(56) References Cited

U.S. PATENT DOCUMENTS

| | | | | |
|---|---|---|---|---|
| 5,057,759 A | * | 10/1991 | Ueda et al. ................. | 318/616 |
| 5,608,300 A | * | 3/1997 | Kawabata et al. .......... | 318/721 |
| 5,635,810 A | * | 6/1997 | Goel .......................... | 318/719 |
| 5,864,217 A | * | 1/1999 | Lyons et al. ................ | 318/652 |
| 6,081,087 A | * | 6/2000 | Iijima et al. ................ | 318/439 |
| 6,137,257 A | * | 10/2000 | Heber et al. ................ | 318/701 |
| 6,396,229 B1 | * | 5/2002 | Sakamoto et al. .......... | 318/439 |
| 6,396,236 B1 | * | 5/2002 | Luukko ....................... | 318/700 |
| 6,462,491 B1 | * | 10/2002 | Iijima et al. ................ | 318/254 |
| 6,462,492 B1 | * | 10/2002 | Sakamoto et al. .......... | 318/254 |
| 6,492,788 B1 | * | 12/2002 | Agirman et al. ............ | 318/700 |
| 6,552,509 B2 | * | 4/2003 | Veltman ..................... | 318/807 |
| 6,670,784 B2 | * | 12/2003 | Odachi et al. .............. | 318/700 |

* cited by examiner

Primary Examiner—Bentsu Ro
(74) Attorney, Agent, or Firm—Ostrolenk, Faber, Gerb & Soffen, LLP

(57) ABSTRACT

A method and system for modifying an estimated rotor angle for improved efficiency in a PMSM drive system. A module monitors a run command, a torque command, and an estimated speed; and in response thereto, generates an output correction angle for modifying the estimated rotor angle. The output correction angle may be added to the estimated rotor angle. The output correction angle may be generated only for predetermined conditions of said run command, torque command, and speed. In particular, the output correction angle may be generated (1) when the run command is asserted, (2) when the torque command is above a predetermined level, and (3) when variations in the speed are within predetermined limits.

22 Claims, 4 Drawing Sheets

EFFICIENCY OPTIMIZATION CONTROL FOR PERMANENT MAGNET MOTOR DRIVE

CROSS-REFERENCE

This is a continuation of U.S. patent application Ser. No. 10/684,928, filed Oct. 14, 2003, entitled EFFICIENCY OPTIMIZATION CONTROL FOR PERMANENT MAGNET MOTOR DRIVE, now U.S. Pat. No. 6,856,109 B2. This application is based upon and claims priority of U.S. Provisional Application Ser. No. 60/418,735, filed Oct. 15, 2002, incorporated by reference.

BACKGROUND OF THE INVENTION

1. Field of the Invention

The present invention relates to motor drives, and more particularly to a motor drive with improved rotor angle estimation for greater efficiency.

2. Description of the Related Art

Most low cost motor drive systems employ encoderless (sensorless) control techniques. The rotor angle is estimated based on a motor model or motor back emf sensing, for example. The motor efficiency and torque per ampere capability can be significantly reduced if an incorrect rotor angle is used for controlling a permanent magnet synchronous motor (PMSM). Rotor angle estimation errors may be due to inaccuracies in estimator (angle) parameters or in motor back emf feedback sensing.

FIG. 2 is a graph illustrating motor output power versus rotor angle error for a surface-mounted permanent magnet motor operating at rated current and speed. As can be seen from FIG. 2, the output power is maximized when rotor angle error is zero.

A known optimization scheme of background interest is described in F. Abrahamsen et al., IEEE/IAS Transactions on Industry Applications, Vol. 37, No. 6 (November/December 2001), "Efficiency-Optimized Control of Medium-Size Induction Motor Drives," incorporated by reference. In a related paper, "Energy Optimal Control of Induction Motor Drives," Inst. Of Energy Technology, Aalborg University (February 2000), incorporated by reference, F. Abrahamsen proposes several measures for driving induction motors at variable speed, including motor drives with pulse-width modulated voltage source inverters.

Inverters for three-phase motor drives are well known in the industry. Typically a DC bus supplies switched power to different phases of an AC motor. With this type of motor control, it is desirable to accurately estimate rotor angle, for example on the basis of current feedback, for high performance control of the motor.

A rotor angle estimation scheme of background interest is described in the present inventor's Ser. No. 10/294,201 filed Nov. 12, 2002; and Ser. No. 60/465,890 filed Apr. 25, 2003, both incorporated by reference.

SUMMARY OF THE INVENTION

The invention relates to an efficiency optimization control algorithm and to a control system using the algorithm, which can be applied to vector controlled permanent magnet AC motor drives to improve motor efficiency. The efficiency optimization algorithm and system continuously modify (using a control algorithm described herein) the estimated rotor angle until the torque command reaches its minimum value under steady state conditions.

According to an aspect of the invention, a system and method for modifying an estimated rotor angle for improved efficiency in a PMSM drive system, may comprise the steps of monitoring a run command, a torque command, and an estimated speed; and in response thereto, generating an output correction angle for modifying the estimated rotor angle. The output correction angle may be added to the estimated rotor angle. The output correction angle may be generated only for predetermined conditions of said run command, torque command, and speed. In particular, the output correction angle may be generated (1) when the run command is asserted, (2) when the torque command is above a predetermined level, and (3) when variations in the speed are within predetermined limits.

Other features and advantages of the present invention will become apparent from the following description of embodiments of the invention which refers to the accompanying drawings.

BRIEF DESCRIPTION OF THE DRAWING(S)

DESCRIPTION OF EMBODIMENTS OF THE INVENTION

Figure 1:
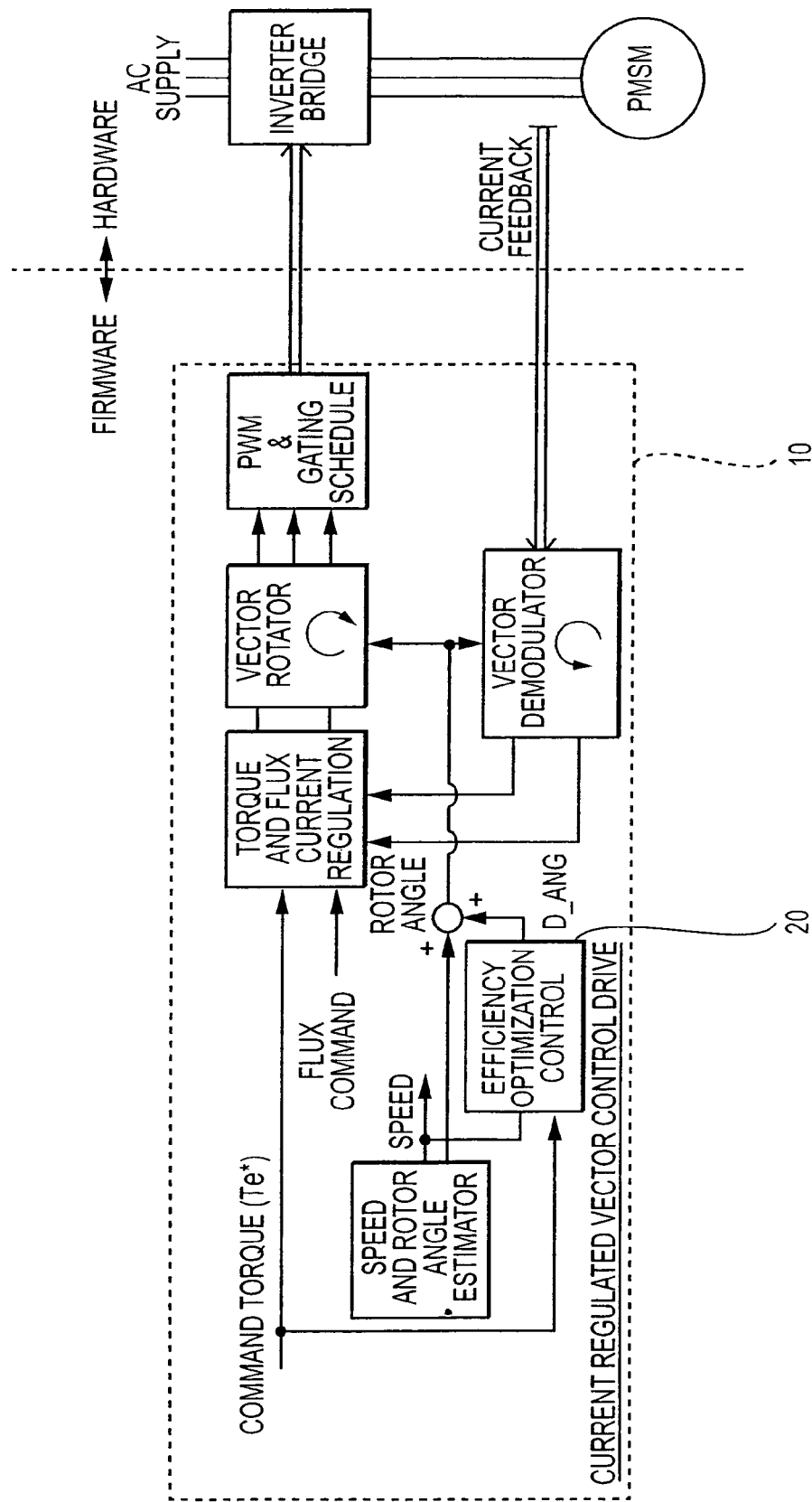
FIG. 1 is a block diagram of a vector-controlled motor drive system utilizing the invention.

FIG. 1 is a block diagram illustrating the placement of the efficiency control algorithm module 20 in a vector controlled system 10.

Figure 3:
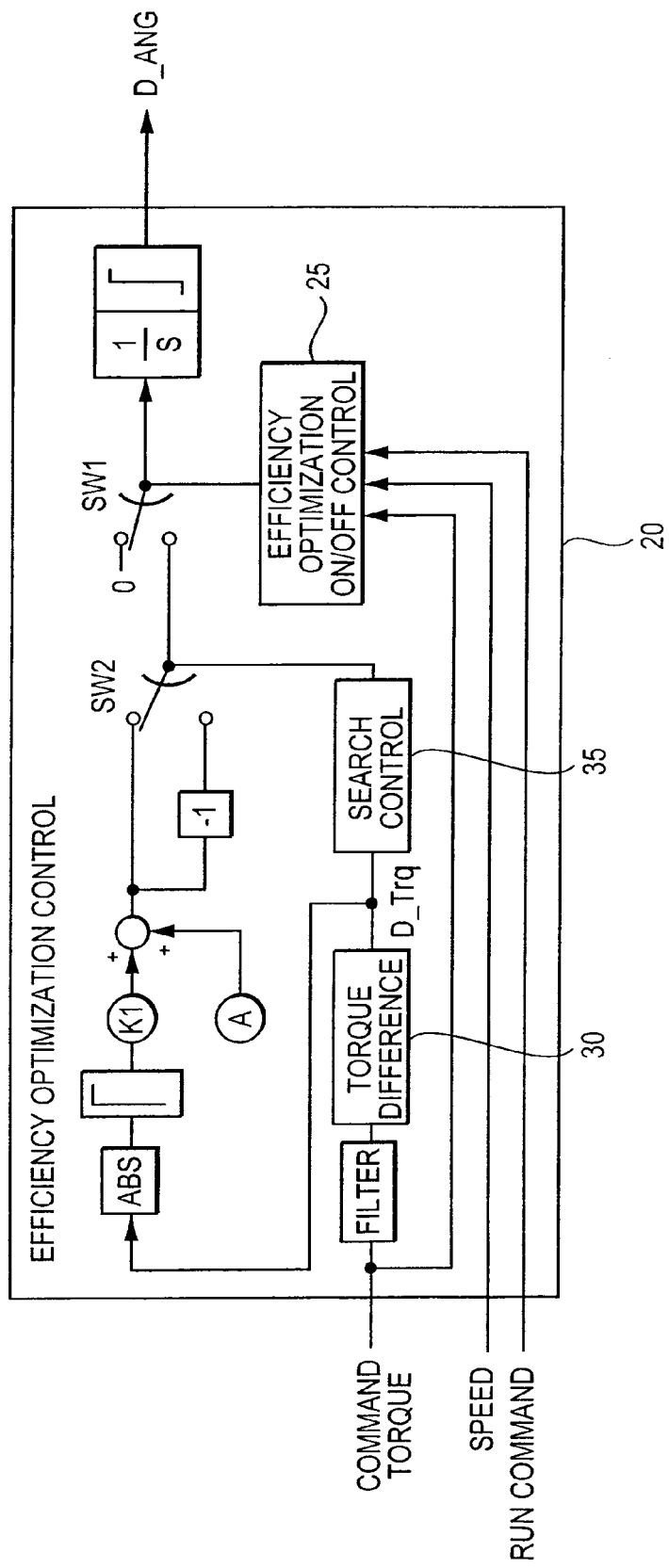
FIG. 3 is a detailed block diagram of the efficiency optimization controller.
Figure 4A:
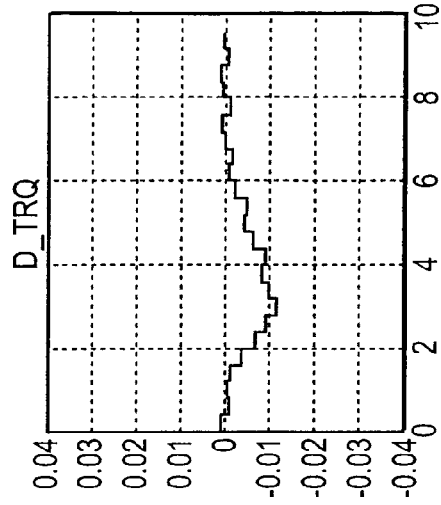
FIG. 4 is a series of graphs illustrating a simulation run of the efficiency control algorithm.
Figure 4B:
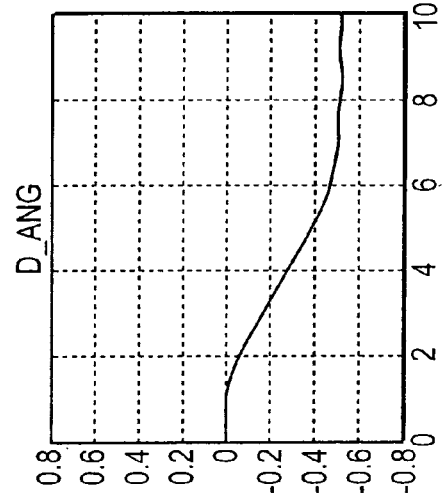
Figure 4C:
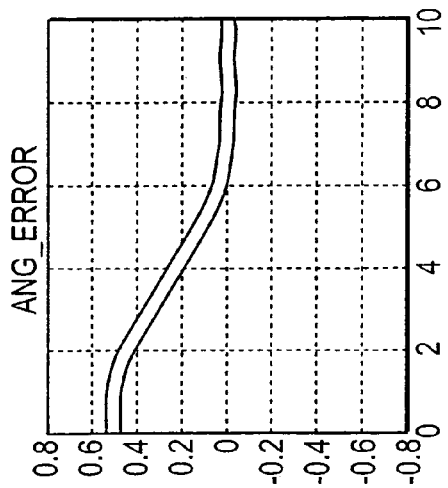
Figure 4D:
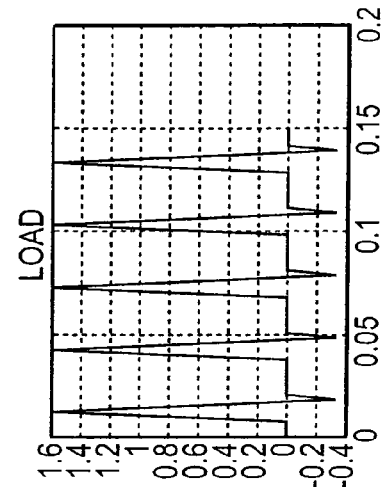
Figure 4E:
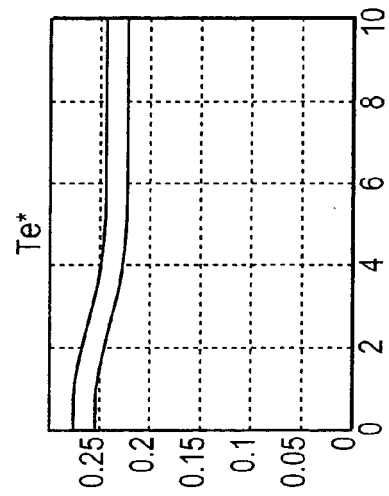
Figure 4F:
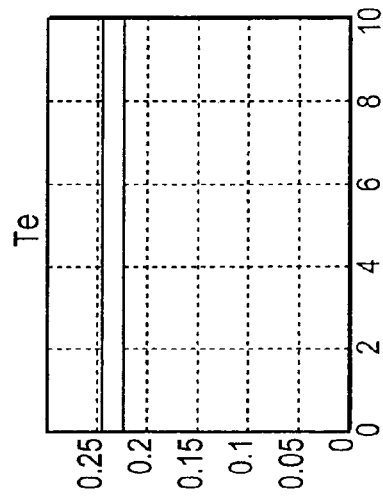

FIG. 3 shows the efficiency optimization control module in more detail. The efficiency optimization on/off control 25 monitors the drive run command, the estimated motor speed and the torque command. If (1) the run command is asserted, (2) speed variation (speed derivative) stays within certain bounds, and (3) motor current (torque command) is above a certain level then switch SW1 is activated. The output correction angle (D_Ang) is discharged (for example, in 10 sec) to zero if any of the above three conditions cannot be satisfied.

The torque difference block 30 computes a difference (between present and a past sample) in the average (for example, filtered 10 rad/sec) command torque. The search control block 35 determines the state of SW2 based on the sign of D_Trq. If the torque difference (D_Trq) is equal to or larger than zero then switch SW2 will switch state; otherwise SW2 will maintain (take no action) at its former state. Gain K1 is used to adjust the controller response and constant A provides an excitation test signal for searching minimum torque level.

Figure 2:
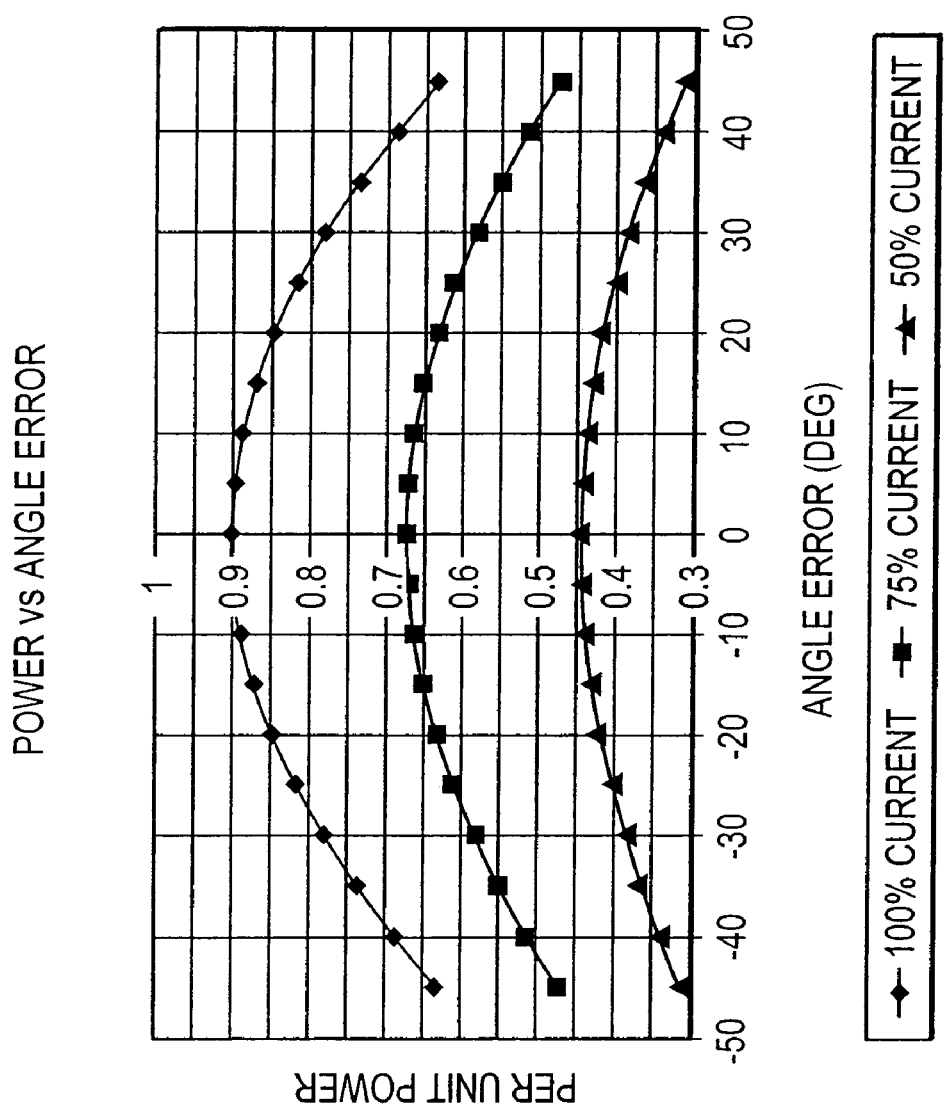
FIG. 2 is a graph illustrating motor output power versus rotor angle error for a PMSM.

The characteristics of power versus angle error (FIG. 2) can be predicted offline. Then K1 and A can be formulated based on the power (torque) sensitivity versus rotor angle error.

FIG. 4 shows a simulation run of the efficiency control algorithm. A surface-mounted permanent magnet motor driving a compressor load was used for this simulation run. An initial rotor angle error of 0.5 rad was used. When the efficiency optimization control was activated (at time=1.8 sec), the angle error was corrected and the drive torque per ampere was improved (Te* reduced in FIG. 4). Since the magnitude of motor current is proportional to command torque level, therefore the motor current was also reduced.

DEFINITIONS

D_Trq—Difference between filtered command torque (present and past samples)
D_Ang—Angle output of efficiency optimization controller (Rad.)
Te*—Torque command (N-M)
Te—Motor torque (N-M)
Load—Compressor load
Ang_Error—Angle difference between estimated angle and actual rotor angle (Rad.)

Although the present invention has been described in relation to particular embodiments thereof, many other variations and modifications and other uses will become apparent to those skilled in the art. Therefore, the present invention is not limited by the specific disclosure herein.

What is claimed is:

1. Apparatus for driving an electric motor comprising:
   an inverter providing switched electrical power to the motor from an electrical supply voltage source;
   a controller providing gating signals to the inverter to control the switches of the inverter;
   the controller receiving a torque command signal corresponding to a desired motor torque to control the motor speed;
   the controller further receiving a current feedback signal related to the current supplied to the motor by the inverter;
   the controller including a speed and rotor angle estimator for estimating the speed of the motor and the rotor angle of the motor and providing an estimated speed signal and an estimated rotor angle signal; further comprising
   a vector demodulator receiving the current feedback signal and for controlling the gating signals to achieve a desired motor speed corresponding to the torque command;
   further comprising an optimization control for providing a rotor angle correction signal, said rotor angle correction signal being summed with the estimated rotor angle signal to provide a corrected estimated rotor angle signal to reduce an angle error in said estimated rotor angle signal, the corrected estimated rotor angle signal being provided to said vector demodulator to reduce the torque command signal and the current supplied by the inverter to the motor while achieving the desired motor torque, thereby improving efficiency of operation of the motor.

2. The apparatus of claim 1 wherein the optimization control comprises:
   an efficiency optimization on/off control unit for controlling the state of a first switch, whereby in a first state, the switch provides a first input that provides a zero rotor angle correction signal, and whereby in a second state the switch provides a second input that generates the rotor angle correction signal,
   the efficiency optimization on/off control unit being responsive to the estimated speed signal, said torque command signal and a run command signal, and whereby said first switch is controlled to said second state when the run command is asserted, said estimated speed signal varies only within a limited range and the torque command is above a preset level;
   a torque difference unit receiving the torque command signal and generating a difference signal comprising the difference between a present and a past sample of the torque command signal; and
   a search control unit for controlling a second switch supplying the second input to the first switch, the search control unit determining the state of the second switch based on the sign of the difference signal.

3. The apparatus of claim 2 wherein the search control unit changes the present state of the second switch if the difference signal is greater than or equal to zero; and maintains the present state of the second switch if the difference signal is less than zero.

4. The apparatus of claim 3, further comprising an integrator coupled to the output of said first switch and providing said rotor angle correction signal.

5. The apparatus of claim 3, further comprising a gain adjustment block, the gain adjustment block receiving said difference signal and adjusting said difference signal by a gain factor to produce a gain adjusted difference signal.

6. The apparatus of claim 5, further comprising a constant value generator providing a constant value signal, the constant value signal being summed with said gain adjusted difference signal, to produce a second gain adjusted difference signal, the second gain adjusted difference signal being provided to a first input of said second switch.

7. The apparatus of claim 6, further comprising an inverter for inverting said second gain adjusted difference signal to produce an inverted gain adjusted difference signal, said inverted gain adjusted difference signal being provided to a second input of said second switch.

8. The apparatus of claim 7, further comprising a filter receiving said torque command signal and providing a filtered torque command signal to said torque difference unit.

9. The apparatus of claim 5, further comprising an absolute value former for forming the absolute value of said difference signal.

10. The apparatus of claim 1, wherein said controller further comprises a current regulator receiving said torque command signal and the output of said vector demodulator; and a vector rotator receiving an output from said current regulator and said corrected estimated rotor angle signal, an output of said vector rotator being provided to a gating module for providing said gating signals to said inverter.

11. The apparatus of claim 10, wherein the gating module comprises a pulse width modulator.

12. A method for driving an electric motor comprising:
   providing switched electrical power from an inverter to the motor from an electrical supply voltage source;
   providing gating signals to the inverter to control the switches of the inverter;
   receiving a torque command signal corresponding to a desired motor torque to control the motor speed;
   further receiving a current feedback signal related to the current supplied to the motor by the inverter;
   estimating the speed of the motor and the rotor angle of the motor and providing an estimated speed signal and an estimated rotor angle signal; further comprising
   providing the current feedback signal to a vector demodulator and controlling the gating signals to achieve a desired motor speed corresponding to the torque command;
   further comprising providing a rotor angle correction signal, said rotor angle correction signal being summed with the estimated rotor angle signal to provide a corrected estimated rotor angle signal to reduce an angle error in said estimated rotor angle signal, the corrected estimated rotor angle signal being used to reduce the torque command signal and the current supplied by the inverter to the motor while achieving the desired motor torque, thereby improving efficiency of operation of the motor.

13. The method of claim 12, further comprising:

controlling the state of a first switch, whereby in a first state, the switch provides a first input that provides a zero rotor angle correction signal, and whereby in a second state the switch provides a second input that generates the rotor angle correction signal, said step of controlling the state of the first switch comprising controlling said first switch to said second state when the run command is asserted, said estimated speed signal varies only within a limited range and the torque command is above a preset level;

receiving the torque command signal and generating a difference signal comprising the difference between a present and a past sample of the torque command signal; and controlling a second switch supplying the second input to the first switch by determining the state of the second switch based on the sign of the difference signal.

14. The method of claim 13, further comprising changing the present state of the second switch if the difference signal is greater than or equal to zero; and maintaining the present state of the second switch if the difference signal is less than zero.

15. The method of claim 14, further comprising integrating an output of said first switch and providing said rotor angle correction signal.

16. The method of claim 14, further comprising receiving said difference signal and adjusting said difference signal by a gain factor to produce a gain adjusted difference signal.

17. The method of claim 16, further comprising summing a constant value signal with said gain adjusted difference signal, to produce a second gain adjusted difference signal, the second gain adjusted difference signal being provided to a first input of said second switch.

18. The method of claim 17, further comprising inverting said second gain adjusted difference signal to produce an inverted gain adjusted difference signal, and providing said inverted gain adjusted difference signal to a second input of said second switch.

19. The method of claim 18, further comprising filtering said torque command signal.

20. The method of claim 16, further comprising forming the absolute value of said difference signal.

21. The method of claim 12, further comprising providing said torque command signal and the output of said vector demodulator to a current regulator; and providing an output from said current regulator and said corrected estimated rotor angle signal to a vector rotator and providing an output of said vector rotator to a gating module for providing said gating signals to said inverter.

22. The method of claim 21, further comprising providing an output of the gating module as a pulse width modulated signal.

* * * * *